United States Patent
Saito et al.

(10) Patent No.: US 12,139,601 B2
(45) Date of Patent: Nov. 12, 2024

(54) METHOD FOR IMPROVING TRACKING RESISTANCE OF THERMOPLASTIC RESIN

(71) Applicant: Polyplastics Co., Ltd., Tokyo (JP)

(72) Inventors: Itsuki Saito, Fuji (JP); Yoshihiro Asai, Fuji (JP); Kazuya Goshima, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 512 days.

(21) Appl. No.: 17/434,226

(22) PCT Filed: Mar. 24, 2020

(86) PCT No.: PCT/JP2020/012870
§ 371 (c)(1),
(2) Date: Aug. 26, 2021

(87) PCT Pub. No.: WO2020/196470
PCT Pub. Date: Oct. 1, 2020

(65) Prior Publication Data
US 2022/0119638 A1    Apr. 21, 2022

(30) Foreign Application Priority Data
Mar. 25, 2019  (JP) .................. 2019-056265

(51) Int. Cl.
*C08L 67/02*  (2006.01)
(52) U.S. Cl.
CPC ........... *C08L 67/02* (2013.01); *C08L 2203/20* (2013.01)
(58) Field of Classification Search
CPC ............................ C08L 67/02; C08L 2203/20
USPC ....................................................... 528/288
See application file for complete search history.

(56) References Cited

U.S. PATENT DOCUMENTS

| | | |
|---|---|---|
| 2011/0098388 A1 | 4/2011 | Sakata et al. |
| 2011/0160364 A1 | 6/2011 | Toyohara et al. |
| 2012/0083553 A1 | 4/2012 | Wakatsuka et al. |
| 2018/0201778 A1 | 7/2018 | Moriya et al. |

FOREIGN PATENT DOCUMENTS

| | | |
|---|---|---|
| EP | 2931812 A1 | 10/2015 |
| JP | H06-57108 A | 3/1994 |
| JP | H06-228411 A | 8/1994 |
| JP | 9-50710 A | 2/1997 |
| JP | H10-067926 A | 3/1998 |
| JP | 2007-70615 A | 3/2007 |
| JP | 2007-119645 | 5/2007 |
| JP | 2008-50579 A | 3/2008 |
| JP | 2010-280793 A | 12/2010 |
| KR | 10-2004-0001572 A | 1/2004 |
| KR | 2004001572 A * | 1/2004 |
| WO | 2007/007663 A1 | 1/2007 |
| WO | 2009/150831 A1 | 12/2009 |
| WO | 2014/089806 A1 | 6/2014 |
| WO | 2017/010337 A1 | 1/2017 |

OTHER PUBLICATIONS

KR 2004-0001572A—machine translation (Year: 2004).*
International Search Report dated Jun. 9, 2020, issued in counterpart International Application No. PCT/JP2020/012870, with English Translation. (5 pages).
"Latest Flame Retardants and Flame Retardant Technologies [non-official translation]", Technical Information Institute, Jul. 30, 1999, with English translation. (4 pages).

* cited by examiner

*Primary Examiner* — Ling Siu Choi
*Assistant Examiner* — Ronald Grinsted
(74) *Attorney, Agent, or Firm* — WHDA, LLP

(57) ABSTRACT

A method for improving the comparative tracking index of a thermoplastic resin, as measured in compliance with IEC60112, 3rd edition, is disclosed by blending a carbodiimide compound in the thermoplastic resin; use of a carbodiimide compound for improving the comparative tracking index of a thermoplastic resin, as measured in compliance with IEC60112, 3rd edition; and a tracking resistance improving agent for a thermoplastic resin, for improving the comparative tracking index of the thermoplastic resin, as measured in compliance with IEC60112, 3rd edition. The carbodiimide compound is preferably used at a ratio of 0.01 parts by mass or more with respect to 100 parts by mass of the thermoplastic resin.

12 Claims, No Drawings

METHOD FOR IMPROVING TRACKING RESISTANCE OF THERMOPLASTIC RESIN

TECHNICAL FIELD

The present invention relates to a method for improving the tracking resistance of a thermoplastic resin.

BACKGROUND ART

For resin components used in the proximity of power sources for electric/electronic components, such as relays, switches, and connectors, when moisture, dust, etc. adheres to their surfaces during use and micro discharges occur repeatedly, occasionally conductive paths are generated on the surfaces and dielectric breakdown phenomena (tracking) occur, resulting in a short circuit between electrodes. As such, resins constituting components used in the proximity of electric/electronic components are required to have tracking resistance. For example, Patent Document 1 indicates that resin compositions, in which an ethylene ethyl acrylate copolymer and an epoxy compound are blended in a glass fiber-reinforced polybutylene terephthalate resin, have excellent tracking resistance.

Meanwhile, carbodiimide compounds, by being blended in a resin together with an elastomer, are known to improve the hydrolysis resistance and high durability of resins in hot-cold cycle environments (e.g., Patent Document 2).

CITATION LIST

Patent Literature

Patent Document 1: WO 2017/010337 A
Patent Document 2: WO 2009/150831 A

SUMMARY OF INVENTION

Technical Problem

The present invention addresses the problem of providing a method for improving the tracking resistance of a thermoplastic resin, a use of a carbodiimide compound for improving the tracking resistance of a thermoplastic resin, and a tracking resistance improving agent for a thermoplastic resin.

Solution to Problem

The present invention relates to the following.

[1] A method for improving the comparative tracking index of a thermoplastic resin, as measured in compliance with IEC 60112, 3rd edition, by blending a carbodiimide compound in the thermoplastic resin.

[2] The method according to [1], wherein the thermoplastic resin has one or more functional groups selected from a carboxy group, a hydroxy group, and an amino group.

[3] The method according to [1] or [2], wherein the carbodiimide compound is blended at a ratio of 0.01 parts by mass or more with respect to 100 parts by mass of the thermoplastic resin.

[4] The method according to any one of [1] to [3], wherein the carbodiimide compound includes an aromatic carbodiimide compound.

[5] The method according to any one of [1] to [4], wherein the carbodiimide compound has a number average molecular weight of 300 or more.

[6] The method according to any one of [1] to [5], wherein the thermoplastic resin includes a thermoplastic resin with a processing temperature of 350° C. or less.

[7] Use of a carbodiimide compound for improving the comparative tracking index of a thermoplastic resin, as measured in compliance with IEC 60112, 3rd edition.

[8] The use according to [7], wherein the thermoplastic resin has one or more functional groups selected from a carboxy group, a hydroxy group, and an amino group.

[9] The use according to [7] or [8], wherein the carbodiimide compound is used at a ratio of 0.01 parts by mass or more with respect to 100 parts by mass of the thermoplastic resin.

[10] The use according to any one of [7] to [9], wherein the carbodiimide compound includes an aromatic carbodiimide compound.

[11] The use according to any one of [7] to [10], wherein the carbodiimide compound has a molecular weight of 300 or more.

[12] The use according to any one of [7] to [11], wherein the thermoplastic resin includes a thermoplastic resin with a processing temperature of 350° C. or less.

[13] A tracking resistance improving agent for a thermoplastic resin, for improving the comparative tracking index of a thermoplastic resin, as measured in compliance with IEC 60112, 3rd edition, the tracking resistance improving agent including a carbodiimide compound.

[14] The tracking resistance improving agent according to [13], wherein the thermoplastic resin has one or more functional groups selected from a carboxy group, a hydroxy group, and an amino group.

[15] The tracking resistance improving agent according to [13] or [14], for use in an amount achieving 0.01 parts by mass or more of the carbodiimide compound with respect to 100 parts by mass of the thermoplastic resin.

[16] The tracking resistance improving agent according to any one of [13] to [15], wherein the carbodiimide compound includes an aromatic carbodiimide compound.

[17] The tracking resistance improving agent according to any one of [13] to [16], wherein the carbodiimide compound has a molecular weight of 300 or more.

[18] The tracking resistance improving agent according to any one of [13] to [17], for a thermoplastic resin having a processing temperature of 350° C. or less.

Effects of Invention

According to the present invention, it is possible to provide a method for improving the tracking resistance of a thermoplastic resin, a use of a carbodiimide compound for improving the tracking resistance of a thermoplastic resin, and a tracking resistance improving agent for a thermoplastic resin.

DESCRIPTION OF EMBODIMENTS

An embodiment of the present invention shall be explained in detail below. The present invention is not limited by the following embodiment and can be carried out with the addition of appropriate modifications so long as the effects of the present invention are not hindered. In cases where the specific description provided for one embodiment also applies to another embodiment, the explanation may be omitted for the other embodiment.

Method for Improving Tracking Resistance

A method for improving the tracking resistance according to the present embodiment is a method for improving the tracking resistance of a thermoplastic resin by blending a carbodiimide compound in the thermoplastic resin. Conventionally, as described in Patent Document 2, carbodiimide compounds were known to be capable of improving the heat shock resistance and hydrolysis resistance of thermoplastic resins. However, the present inventors' research revealed that carbodiimide compounds can, surprisingly, improve the tracking resistance of thermoplastic resins. The "heat shock resistance" examined in Patent Document 2 refers to high durability in a hot-cold cycle environment and "hydrolysis resistance" refers to a property that suppresses reductions in strength due to hydrolysis in a moist-heat environment (high-temperature and high-humidity). In contrast, the "tracking resistance" newly discovered by the present inventors is a property in which conductive paths are unlikely to form on resin surfaces even when dust or water adheres to the resin surfaces and micro discharges repeatedly occur, and is a property that is completely different from heat shock resistance or hydrolysis resistance.

Moreover, "tracking resistance" can be represented by a comparative tracking index (CTI) measured in compliance with IEC60112, 3rd edition. When the CTI is 500 V or more, the tracking resistance can be said to be excellent. Methods for measuring CTI are described below.

Further, "improving tracking resistance" means either of the following:
(i) improving from a CTI that is less than 500 V before the addition of a carbodiimide compound to a CTI that is 500 V or more after the addition of a carbodiimide compound, or
(ii) the ratio [(CTI-2)/(CTI-1]] of CTI (CTI-1) before the addition of a carbodiimide compound and the CTI (CTI-2) after the addition of a carbodiimide compound is 1.10 or more.

The CTI ratio [(CTI-2)/(CTI-1)] in (ii) is preferably 1.15 or more.

Thermoplastic Resin

As the thermoplastic resin, there is no particular limitation and a thermoplastic resin required to have an increased tracking resistance can be used. For example, the resin may be a thermoplastic resin, such as a polyphenylene sulfide resin, which has low tracking resistance on its own, or the resin may be a thermoplastic resin, such as a polybutylene terephthalate resin, which has excellent tracking resistance on its own but the tracking resistance is reduced by the addition of fillers, etc. for adjusting various characteristics such as mechanical strength. By blending a carbodiimide compound as mentioned below with a thermoplastic resin that has a low tracking resistance, it is possible to improve the tracking resistance of the thermoplastic resin. Further, by blending a carbodiimide compound as mentioned below with a thermoplastic resin which has excellent tracking resistance on its own but the tracking resistance is reduced by the addition of fillers, etc. for adjusting various characteristics such as mechanical strength, it is possible to suppress reductions in the tracking resistance of the thermoplastic resin.

Examples of the thermoplastic resin include polyester resins such as polybutylene terephthalate (PBT) and polyethylene terephthalate (PET); polycarbonate resins; vinyl resins such as polyacrylic acid esters and polymethacrylic acid esters; polyamide (PA) resins such as nylon 6 and nylon 66; and liquid crystal polymers (polymers displaying melt processability with the property of being capable of forming optical anisotropic molten phase, e.g., aromatic polyesters; aromatic polyesteramides; polyesters partially including an aromatic polyester and/or an aromatic polyesteramide in the same molecular chain). Further, polyarylene sulfide resins such as polyphenylene sulfide (PPS) in which a carboxylic acid end group is generated as a side reaction during polymerization are also included. One or more thermoplastic resins selected from the foregoing can be used.

The thermoplastic resin is preferably at least a thermoplastic resin that has one or more functional groups selected from a carboxy group, a hydroxy group, and an amino group.

For example, the thermoplastic resin is preferably a polyester resin, a polycarbonate resin, a polyamide (PA) resin, a liquid crystal polymer, etc. mentioned above having, in an end group, one or more groups selected from a carboxy group, a hydroxy group, and an amino group.

Further, the thermoplastic resin may be a resin in which the abovementioned thermoplastic resin is copolymerized with a copolymer component having one or more groups selected from a carboxy group, a hydroxy group, and an amino group, or after polymerization of the abovementioned thermoplastic resin, one or more groups selected from a carboxy group, a hydroxy group, and an amino group may be generated by hydrogenation and oxidation.

From the perspective of preventing the generation of gases and odors from the carbodiimide compound during processing, the thermoplastic resin preferably includes a thermoplastic resin with a processing temperature of 350° C. or less, preferably 340° C. or less, and more preferably 300° C. or less. The "processing temperature" is a temperature at which the thermoplastic resin is melted and kneaded and is usually the melting point of the thermoplastic resin (softening point in the case of non-crystalline resins) ±50° C. in many cases. The content of the thermoplastic resin with a processing temperature of 350° C. or less is preferably 50 mass % or more, more preferably 80 mass % or more, and can be 100 mass %, in the resin components.

Carbodiimide Compound

A carbodiimide compound is a compound that has a carbodiimide group (—N=C=N—) in the molecule. Examples of the carbodiimide compound include aliphatic carbodiimide compounds with an aliphatic main chain; alicyclic carbodiimide compounds with an alicyclic main chain, and aromatic carbodiimide compounds with an aromatic main chain, and it is possible to use one or more compounds selected therefrom. Among these compounds, in terms of being capable of further improving tracking resistance, the inclusion of an aromatic carbodiimide compound is preferred.

Examples of the aliphatic carbodiimide compound include diisopropylcarbodiimide, dioctyldecylcarbodiimide, etc. Examples of the alicyclic carbodiimide compound include dicyclohexylcarbodiimide, etc. It is also possible to use two or more of these compounds in combination.

Examples of the aromatic carbodiimide compound include mono- or di-carbodiimide compounds such as diphenylcarbodiimide, di-2,6-dimethylphenylcarbodiimide, N-toluyl-N'-phenylcarbodiimide, di-p-nitrophenylcarbodiimide, di-p-aminophenylcarbodiimide, di-p-hydroxyphenylcarbodiimide, di-p-chlorophenylcarbodiimide, di-p-methoxyphenylcarbodiimide, di-3,4-dichlorophenylcarbodiimide, di-2,5-dichlorophenylcarbodiimide, di-o-chlorophenylcarbodiimide, p-phenylene-bis-di-o-toluylcarbodiimide, p-phenylene-bisdicyclohexylcarbodiimide, p-phenylene-bis-di-p-chlorophenylcarbodiimide, and ethylene-bis-diphenylcarbodiimide; and polycarbodiimide compounds such as poly(4,4'-diphenylmethanecarbodiimide), poly(3,5'-dimethyl-4,4'-biphenylmethanecarbodiimide), poly(p-phenylenecarbodiimide), poly(m-phenylenecarbodiimide), poly(3,5'-dimethyl-4,4'-diphenylmethanecarbodiimide), poly(naphthylenecarbodiimide), poly(1,3-diisopropylphenylenecarbodiimide), poly(1-methyl-3,5-diisopropylphenylenecarbodiimide), poly(1,3,5-triethylphenylenecarbodiimide), and poly(triisopropylphenylenecarbodiimide). It is also possible to use two or more of these compounds in combination.

Among these compounds, it is possible to suitably use one or more compounds selected from di-2,6-dimethylphenylcarbodiimide, poly(4,4'-diphenylmethanecarbodiimide), poly(phenylenecarbodiimide), and poly(triisopropylphenylenecarbodiimide) in particular.

The carbodiimide compound preferably has a number average molecular weight of 300 or more. By making the number average molecular weight within the abovementioned range, it is possible to prevent the generation of gases and odors when the residence time of the thermoplastic resin during melt-kneading or molding is long. The number average molecular weight can be measured by gel permeation chromatography (GPC) using a polystyrene standard sample reference.

The blending amount of the carbodiimide compound, with respect to 100 parts by mass of the thermoplastic resin, is preferably 0.01 parts by mass or more, more preferably 0.05 parts by mass or more, and even more preferably 0.1 parts by mass or more. By blending the carbodiimide compound at 0.01 parts by mass or more with respect to 100 parts by mass of the thermoplastic resin, it is possible to reliably improve the tracking resistance of the thermoplastic resin. In terms of reliably improving the tracking resistance of the thermoplastic resin and preventing gases and odors during processing, the upper limit value can be made 20 parts by mass or less, 15 parts by mass or less, 10 parts by mass or less, 8 parts by mass or less, 5.5 parts by mass or less, or 5 parts by mass or less.

To facilitate the handling of the carbodiimide compound, it is also possible to disperse the carbodiimide compound in a matrix resin and use as a masterbatch. When used as a masterbatch, the masterbatch is used such that the blending amount of the carbodiimide compound achieves the abovementioned blending amount with respect to a total of 100 parts by mass of the thermoplastic resin, for which the tracking resistance is to be improved, and the matrix resin. The type of the matrix resin is not particularly limited and for example, can be selected from the abovementioned thermoplastic resins, may be the same type of resin as the thermoplastic resin for which the tracking resistance is to be improved, or may be a different type of resin.

The method for preparing the masterbatch is not particularly limited, and the masterbatch can be produced by kneading the matrix resin and the carbodiimide compound using a conventional method. For example, the masterbatch can be produced by loading the matrix resin and the carbodiimide compound into a mixer and uniformly mixing them, and then melting and kneading using an extruder.

Other Blended Ingredients

In the method for improving tracking resistance according to the present embodiment, so long as the effects of the present invention are not hindered, it is possible to further blend in the thermoplastic resin, as necessary, an additive such as an inorganic filler, a flame retardant, a plasticizer, an antioxidant, a weathering stabilizer, a hydrolysis resistance improving agent, a flowability improving agent, a molecular weight adjusting agent, an ultraviolet absorbing agent, an anti-static agent, a colorant (dye or pigment), a lubricant, a crystallization promoting agent, a crystal nucleating agent, a near infrared absorbing agent, or an organic filler.

Examples of the inorganic filler include fibrous inorganic fillers such as glass fibers; granular inorganic fillers such as silica, quartz powder and glass beads; tabular fillers such as mica and glass flakes; etc. In terms of increasing the strength of the molded article, the blending amount of the inorganic filler, with respect to 100 parts by mass of the thermoplastic resin, is preferably 5-200 parts by mass and more preferably 20-100 parts by mass.

As the flame retardant, a publicly known flame retardant, e.g., a halogen-based flame retardant such as a bromine-based compound or a phosphorus-based (non-halogen-based) flame retardant such as a metal phosphate or a phosphoric acid ester, can be used. Further, a flame retardant promoter, such as an antimony compound or a triazine compound, may be used in combination therewith. In addition, from the perspective of tracking resistance, the use of a phosphorus-based flame retardant, which is less likely to carbonize than a halogen-based flame retardant, is preferred. The blending amount of the flame retardant and/or flame retardant promoter may be set as appropriate according to the desired flame retardance, but in terms of achieving both flame retardance and mechanical characteristics, the blending amount, with respect to 100 parts by mass of the thermoplastic resin, is preferably 5-50 parts by mass and more preferably 10-30 parts by mass.

As for blended ingredients other than inorganic fillers and flame retardants, those conventionally known can be used. The blending amount of other blended ingredients, with respect to 100 parts by mass of the thermoplastic resin, is preferably 0.01-20 parts by mass and more preferably 0.1-10 parts by mass.

Further, to further improve the tracking resistance of the thermoplastic resin and/or to confer other characteristics (heat shock resistance, low warping property, etc.), an alloy material can be blended in the thermoplastic resin as necessary. Examples of the alloy material include thermoplastic elastomers, core-shell polymers, fluorine-based resins, polyolefins, polyamides, etc. and it is possible to use one or more materials selected therefrom.

Examples of the thermoplastic elastomers include olefin-based elastomers, styrene-based elastomers, polyester-based elastomers, etc., which are optionally grafted. Specific examples of the thermoplastic elastomers include, for example, propylene-ethylene copolymers, ethylene ethylacrylate copolymers (EEA), graft copolymers of ethylene ethylacrylate and butylacrylate-methylmethacrylate (EEA-g-BAMMA copolymers), maleic anhydride (MAH)-modified polyolefins, etc.

Examples of the core-shell elastomers include methylmethacrylate-butylacrylate copolymers, etc. The core-shell elastomer may have a functional group such as a glycidyl group on the shell.

Examples of the fluorine-based resins include polytetrafluoroethylene (PTFE), etc.

Examples of the polyolefins include polyethylenes, polypropylenes, cyclic polyolefins, copolymers thereof, etc.

Examples of the polyamides include nylon 6 (PA6), nylon 11, nylon 12, nylon 66, etc.

The blending amount of the alloy material, with respect to 100 parts by mass of the thermoplastic resin, is preferably 3-50 parts by mass and more preferably 5-30 parts by mass.

Further, to further improve the tracking resistance of the thermoplastic resin, an epoxy compound can also be blended in the thermoplastic resin. Examples of the epoxy compound include, for example, aromatic epoxy compounds such as biphenyl-type epoxy compounds, bisphenyl A-type epoxy compounds, phenol novolak-type epoxy compounds, and cresol novolak-type epoxy compounds. For the epoxy compound, two or more compounds may be used in any arbitrary combination. The epoxy equivalent weight is preferably 600-1500 g/eq.

Blending Method

The method for blending the carbodiimide compound and the blended ingredients to be added as necessary in the thermoplastic resin is not particularly limited, and preparations can be easily made using equipment and methods generally used in conventional resin composition preparation methods or molding methods. For example, it is possible to use any methods, such as 1) a method involving mixing the resin component and the other components, then kneading and extruding with a single-screw or twin-screw extruder to prepare a pellet, followed by molding; 2) a method involving preparing tentative pellets of different compositions, mixing the pellets at predetermined amounts, and subjecting to molding to obtain, after molding, a molded article of a target composition, and 3) a method involving directly loading one, or two or more of the components in a molder. Moreover, a method involving mixing and adding part of the resin component as a fine powder to the other components is preferred in the context of achieving a uniform blend of these components.

The method for blending carbodiimide as a masterbatch in the thermoplastic resin is not particularly limited, and the masterbatch may be loaded together with the thermoplastic resin during melt-kneading thereof to make a uniform pellet. Moreover, components other than the carbodiimide compound may be made into a uniform pellet by melt-kneading, etc. in advance, and when a masterbatch pellet of the carbodiimide compound is molded, a dry-blended pellet blend may be used in the molding.

When kneaded pellets are to be made with an extruder, the resin temperature (processing temperature) in the extruder may be set as appropriate according to the type of the resin used, but in terms of preventing the generation of harmful gases and odors due to degradation of the carbodiimide compound, the extruder cylinder temperature is preferably set to be 350° C. or less. In terms of allowing the resin and carbodiimide to sufficiently react and the tracking resistance to manifest and in terms of allowing other various physical properties to manifest, the extruder cylinder temperature can be set such that the resin temperature in the extruder is preferably 200-330° C. and more preferably 230-300° C.

Comparative Tracking Index

The abovementioned method is preferably a method that increases the comparative tracking index (CTI) of a thermoplastic resin, as measured in compliance with IEC60112, 3rd edition, to 500 V or more and is more preferably a method that increases the CTI to 550 V or more. With a method that increases the CTI to 500 V or more, it is possible to obtain a resin composition that provides a resin molded article with excellent tracking resistance.

Moreover, the abovementioned method is preferably a method that increases the comparative tracking index (CTI) of a thermoplastic resin, as measured in compliance with IEC60112, 3rd edition, to achieve a ratio $[(CTI-2)/(CTI-1)]$ of 1.10 or more before and after the addition of a carbodiimide compound and is more preferably a method that increases the ratio to 1.15 or more.

In the present specification, the CTI can be obtained by a measurement method prescribed in IEC (International Electrotechnical Commission) 60112, 3rd edition. Specifically, measurements are made using an aqueous solution of 0.1 mass % ammonium chloride and platinum electrodes. More specifically, this aqueous solution of ammonium chloride is dripped at a prescribed number of drops (50 drops), a voltage at which none of the test pieces (n=5) breaks is obtained, and this is used as the CTI.

Resin Molded Article

A thermoplastic resin in which a carbodiimide compound is blended using the abovementioned method has excellent tracking resistance, so a molded article thereof can be used for a wide range of applications in which tracking resistance is required. For example, the molded article can be preferably used as electric/electronic components such as relays, switches, connectors, actuators, sensors, transformer bobbins, terminal blocks, covers, switches, sockets, coils, and plugs, particularly components near power sources. The method for obtaining a resin molded article is not particularly limited and a publicly known method can be employed. For example, a resin molded article can be made by loading a resin in which a carbodiimide compound is blended by the abovementioned method into an extruder, melt-kneading to produce a pellet, loading this pellet into an injection molder equipped with a prescribed mold, and injection molding the same.

Use of Carbodiimide

The use of a carbodiimide according to the present embodiment is a use of a carbodiimide compound for improving the comparative tracking index (CTI) of a thermoplastic resin, as measured in compliance with IEC60112, 3rd edition. The abovementioned use is preferably a use for making the CTI of a thermoplastic resin 500 V or more and is more preferably a method for making the CTI 550 V or more.

Moreover, the abovementioned use is preferably a use for increasing the comparative tracking index (CTI) of a thermoplastic resin, as measured in compliance with IEC60112, 3rd edition, to achieve a ratio $[(CTI-2)/(CTI-1)]$ of 1.10 or more before and after the addition of a carbodiimide compound and is more preferably a use for increasing the ratio to 1.15 or more.

The types of carbodiimide compound and thermoplastic resin, etc. are as mentioned above, and therefore descriptions thereof are omitted here. The amount of the carbodiimide compound used is also the same as the abovementioned blending amount of the carbodiimide compound.

Tracking Resistance Improving Agent

The tracking resistance improving agent according to the present embodiment is for improving the comparative tracking index of a thermoplastic resin, as measured in compliance with IEC60112, 3rd edition, by being blended in the thermoplastic resin, and the tracking resistance improving agent contains a carbodiimide compound.

The content of the carbodiimide compound in the tracking resistance improving agent is preferably 50 mass % or more, preferably 70 mass % or more, and can be 80 mass % or more or 90 mass % or more. It is also possible to configure the agent such that it is composed solely of the carbodiimide compound. The tracking resistance improving agent may contain other blended ingredients that may be blended in the thermoplastic resin, as mentioned above. In cases where other blended ingredients are included, the blending amount thereof, in total, can be made less than 50 mass %, 30 mass % or less, 20 mass % or less, or 10 mass % or less. The tracking resistance improving agent may be in the form of a masterbatch in which a carbodiimide compound is dispersed in a matrix resin. In the case of a masterbatch, the type of matrix resin and the method for making the masterbatch are as mentioned above.

The amount of the tracking resistance improving agent used can be an amount at which the amount of the carbodiimide compound achieves the abovementioned blending amount.

The abovementioned tracking resistance improving agent is preferably a tracking resistance improving agent capable of making the comparative tracking index (CTI) of a thermoplastic resin, as measured in compliance with IEC60112, 3rd edition, 500 V or more and is more preferably a tracking resistance improving agent capable of making the CTI 550 V or more.

Moreover, the abovementioned tracking resistance improving agent is preferably a tracking resistance improving agent capable of increasing the comparative tracking index (CTI) of a thermoplastic resin, as measured in compliance with IEC60112, 3rd edition, to achieve a ratio [(CTI-2)/(CTI-1)] of 1.10 or more before and after the addition of a carbodiimide compound and is more preferably a tracking resistance improving agent capable of increasing the ratio to 1.15 or more.

The types of carbodiimide compound and thermoplastic resin, etc. are as mentioned above.

EXAMPLES

The present invention will be explained in further details with the following examples, but the interpretation of the present invention is not limited by these examples.

In each of the examples and comparative examples, the thermoplastic resin and the carbodiimide compound shown in Table 1 were blended, together with blended ingredients (glass fibers, alloy material, hydrolysis resistance improving agent, plasticizer, colorant) used as necessary, at the amounts (parts by mass) shown in Table 1 and melt-kneaded using a twin-screw extruder (manufactured by The Japan Steel Works, Ltd.) with 30 mm φ screw at a cylinder temperature of 260° C. to obtain a pellet-shaped resin composition.

Details of each of the components used are as follows.
(1) Thermoplastic Resin
  PBT1: PBT resin (Intrinsic viscosity: 0.77 dL/g, carboxyl end group amount: 28 meq/kg) manufactured by WinTech Polymer Ltd.
  PBT2: PBT resin (Intrinsic viscosity: 0.88 dL/g, carboxyl end group amount: 12 meq/kg) manufactured by WinTech Polymer Ltd.
  PS: PS resin "PSJ-POLYSTYRENE HF77" manufactured by PS Japan (2) Carbodiimide Compound
  Aromatic carbodiimide: STABAXOL P-100 (number average molecular weight: about 10000) manufactured by LANXESS
  Aliphatic carbodiimide: CARBODILITE LA-1 (number average molecular weight: about 2000) manufactured by Nisshinbo Chemical Inc.
(3) Glass Fibers
  GF1: "ECS03T-127" (fiber diameter: 13 μm) manufactured by Nippon Electric Glass Co., Ltd.
  GF2: "ECS03T-127H" (fiber diameter: 10 μm) manufactured by Nippon Electric Glass Co., Ltd.
(4) Alloy Material
  Alloy material 1: MAH-modified polyolefin (N TAFMER MP0610, manufactured by Mitsui Chemicals, Inc.)
  Alloy material 2: Propylene-ethylene copolymer (Prime Polypro J707EG, manufactured by Primer Polymer Co., Ltd.)
  Alloy material 3: EEA (manufactured by NUC Corporation, ethylene content: 75 mass %, melting point: 91° C.)
  Alloy material 4: EEA-g-BAMMA (MODIPER A5300, manufactured by NOF Corporation)
  Alloy material 5: Glycidyl group-free core-shell (PARALOID EXL2311, manufactured by Dow Chemical Japan Ltd.)
  Alloy material 6: Glycidyl group-containing core-shell (PARALOID EXL2314, manufactured by Dow Chemical Japan Ltd.)
  Alloy material 7: PA6 (UBE Nylon 1015B, manufactured by Ube Industries, Ltd.)
(5) Hydrolysis Resistance Improving Agent
  Epoxy compound 1: Bisphenol A-type epoxy resin (number average molecular weight: 1600, epoxy equivalent weight: 925 g/eq)
  Epoxy compound 2: Bisphenol A-type epoxy resin (number average molecular weight: 1300, epoxy equivalent weight: 720 g/eq)
(6) Plasticizer
  Pyromellitic acid alcohol ester: ADK CIZER UL-100, manufactured by ADEKA Corporation
(7) Colorant
  Carbon black: Mitsubishi Carbon Black MA600, manufactured by Mitsubishi Chemical Corporation Evaluation: Tracking Resistance Using the obtained resin pellets, 70×50×3 mm test pieces were made using "J55AD 60H-USM," an injection molder manufactured by The Japan Steel Works, Ltd. (screw diameter φ 28 mm), and applied voltage (V, volts) produced by tracking in the test pieces was measured using an aqueous solution of 0.1 mass % ammonium chloride and platinum electrodes in compliance with IEC60112. For those in which tracking breakdown did not occur upon an application of 500 V, the applied voltage was increased in 25 V increments and the maximum voltage at which tracking breakdown did not occur when tested was evaluated. Moreover, for those in which tracking breakdown occurred, the evaluation was set as "≤475 V." In addition, for Comparative Examples 1 and 2, after the occurrence of tracking breakdown at 500 V was confirmed, the applied voltage was decreased in 25 V increments and the maximum voltage at which tracking breakdown did not occur was evaluated. The results are shown in Tables 1 and 2.

TABLE 1

|  |  | Examples |  |  |  |  |  | Comparative Examples |  |  |  |
|---|---|---|---|---|---|---|---|---|---|---|---|
|  |  | 1 | 2 | 3 | 4 | 5 | 6 | 1 | 2 | 3 | 4 |
| Thermoplastic resin | PBT1 (IV = 0.77) | 100 | 100 | 100 | 100 | 100 | 100 | 100 | 100 |  | 100 |
|  | PBT2 (IV = 0 88) |  |  |  |  |  |  |  |  | 100 |  |
| Carbodiimide compound | Aromatic carbodiimide | 0.3 | 1.7 | 1.8 | 2.7 | 3.7 |  |  |  |  |  |
|  | Aliphatic carbodiimide |  |  |  |  |  | 1.8 |  |  |  |  |
| Glass fibers | GF1 (13 μmφ) | 50.6 | 51.3 | 54.1 | 54.5 | 55.0 | 54.1 | 50.4 | 52.2 | 52.2 |  |
|  | GF2 (10 μmφ) |  |  |  |  |  |  |  |  |  | 52.2 |
| Alloy material | Alloy material 1 (MAH-modified polyolefin) | 16.9 | 17.1 | 18.0 | 18.2 | 18.3 | 18.0 | 16.8 | 17.4 | 17.4 | 17.4 |
|  | Alloy material 2 (Propylene-ethylene copolymer) |  |  | 3.6 | 3.6 | 3.7 | 3.6 |  |  |  |  |
|  | Alloy material 3 (EEA) |  |  |  |  |  |  |  |  |  |  |
|  | Alloy material 4 (EEA-g-BAMMA) |  |  |  |  |  |  |  |  |  |  |
|  | Alloy material 5 (glycidyl group-free core-shell) |  |  |  |  |  |  |  |  |  |  |
|  | Alloy material 6 (glycidyl group-containing core-shell) |  |  |  |  |  |  |  |  |  |  |
|  | Alloy material 7 (PA6) |  |  |  |  |  |  |  |  |  |  |
| Hydrolysis resistance improving agent | Epoxy compound 1 (Mn = 1600) |  |  | 1.8 | 1.8 | 1.8 | 1.8 |  | 3.5 | 3.5 | 3.5 |
|  | Epoxy compound 2 (Mn = 1300) |  |  |  |  |  |  |  |  |  |  |
| Plasticizer | Pyromellitic acid alcohol ester |  |  |  |  |  |  |  |  |  |  |
| Colorant | Carbon black | 0.2 | 0.2 | 0.2 | 0.2 | 0.2 | 0.2 | 0.2 | 0.2 | 0.2 | 0.2 |
| Tracking resistance (V) |  | 550 | 550 | 550 | 575 | 600 | 525 | 450 | 425 | ≤475 | ≤475 |

|  |  | Comparative Examples |  |  |  |  |  |  |  |  |
|---|---|---|---|---|---|---|---|---|---|---|
|  |  | 5 | 6 | 7 | 8 | 9 | 10 | 11 | 12 | 13 |
| Thermoplastic resin | PBT1 (IV = 0.77) | 100 | 100 | 100 | 100 | 100 | 100 | 100 | 100 | 100 |
|  | PBT2 (IV = 0 88) |  |  |  |  |  |  |  |  |  |
| Carbodiimide compound | Aromatic carbodiimide |  |  |  |  |  |  |  |  |  |
|  | Aliphatic carbodiimide |  |  |  |  |  |  |  |  |  |
| Glass fibers | GF1 (13 μmφ) | 53.1 | 52.2 | 52.2 | 52.2 | 52.2 | 54.1 | 51.8 | 53.1 | 54.1 |
|  | GF2 (10 μmφ) |  |  |  |  |  |  |  |  |  |
| Alloy material | Alloy material 1 (MAH-modified polyolefin) | 17.7 |  |  |  |  | 18.0 | 17.3 | 17.7 | 18.0 |
|  | Alloy material 2 (Propylene-ethylene copolymer) | 3.5 |  |  |  |  |  |  |  |  |
|  | Alloy material 3 (EEA) |  | 17.4 |  |  |  |  |  |  |  |
|  | Alloy material 4 (EEA-g-BAMMA) |  |  | 17.4 |  |  |  |  |  |  |
|  | Alloy material 5 (glycidyl group-free core-shell) |  |  |  | 17.4 |  |  |  |  |  |
|  | Alloy material 6 (glycidyl group-containing core-shell) |  |  |  |  | 17.4 |  |  |  |  |
|  | Alloy material 7 (PA6) |  |  |  |  |  | 3.6 |  |  |  |
| Hydrolysis resistance improving agent | Epoxy compound 1 (Mn = 1600) | 1.8 | 3.5 | 3.5 | 3.5 | 3.5 | 3.6 |  |  | 3.6 |
|  | Epoxy compound 2 (Mn = 1300) |  |  |  |  |  |  | 2.8 | 5.3 |  |
| Plasticizer | Pyromellitic acid alcohol ester |  |  |  |  |  |  |  |  | 3.6 |
| Colorant | Carbon black | 0.2 | 0.2 | 0.2 | 0.2 | 0.2 | 0.2 | 0.2 | 0.2 | 0.2 |
| Tracking resistance (V) |  | 475 | ≤475 | ≤475 | ≤475 | ≤475 | ≤475 | ≤475 | ≤475 | ≤475 |

Content unit: parts by mass

TABLE 2

|  |  | Ex. 7 | Ex. 8 | Comp. Ex. 14 | Ref. Ex. 1 | Ref. Ex. 2 |
|---|---|---|---|---|---|---|
| Thermoplastic resin | PBT1 (IV = 0.77) | 100 | 100 | 100 |  |  |
|  | PBT2 (IV = 0.88) |  |  |  |  |  |
|  | PS |  |  |  | 100 | 100 |
| Carbodiimide compound | Aromatic carbodiimide | 0.7 | 1.4 |  |  | 1.5 |
|  | Aliphatic carbodiimide |  |  |  |  |  |
| Glass fibers | GF1 (13 μmφ) | 43.2 | 43.5 | 42.9 | 42.9 | 43.5 |
|  | GF2 (10 μmφ) |  |  |  |  |  |
| Alloy material | Alloy material 1 (MAH-modified polyolefin) |  |  |  |  |  |
|  | Alloy material 2 (propylene-ethylene copolymer) |  |  |  |  |  |
|  | Alloy material 3 (EEA) |  |  |  |  |  |
|  | Alloy material 4 (EEA-g-BAMMA) |  |  |  |  |  |
|  | Alloy material 5 (glycidylic acid-free core-shell) |  |  |  |  |  |
|  | Alloy material 6 (glycidylic acid-containing core-shell) |  |  |  |  |  |
|  | Alloy material (PA6) |  |  |  |  |  |

TABLE 2-continued

|  |  | Ex. 7 | Ex. 8 | Comp. Ex. 14 | Ref. Ex. 1 | Ref. Ex. 2 |
|---|---|---|---|---|---|---|
| Hydrolysis resistance improving agent | Epoxy compound 1 (Mn = 1600) Epoxy compound 2 (Mn = 1300) |  |  |  |  |  |
| Plasticizer | Pyromellitic acid alcohol ester |  |  |  |  |  |
| Colorant | Carbon black |  |  |  | 0.1 | 0.1 |
| Tracking resistance (V) |  | 375 | 375 | 325 | 575 | 575 |

As shown in Table 1, it was confirmed in Examples 1-6 of the present invention that a tracking resistance of 500 V or more was obtained, and the tracking resistance improved with an increase of the blending amount of the carbodiimide compound. Moreover, although aromatic compounds are usually considered to provide less advantageous tracking resistance than aliphatic compounds, against predictions, Example 3 in which an aromatic carbodiimide was used had a higher tracking resistance than Example 6 in which an aliphatic carbodiimide was used. In addition, when the same composition as Example 5, other than making the blending amount of the carbodiimide compound 10 parts by mass, was used, a deterioration in the operating environment due to odor generation was confirmed.

As shown in Table 2, even without using another additive for improving tracking resistance, Examples 7 and 8 had a CTI ratio of 1.15 with respect to before the addition of carbodiimide (Comparative Example 14). That is, it was possible to make the ratio [(CTI-2)/(CTI-1)] between the CTI (CTI-1) before the addition of the carbodiimide compound and the CTI (CTI-2) after the addition of the carbodiimide compound 1.10 or more.

Moreover, from a comparison between the examples and Reference Examples 1 and 2, it was newly discovered that the tracking resistance can be particularly improved in thermoplastic resins containing a functional group reactive with carbodiimide in the end group.

The invention claimed is:

1. A method for improving the comparative tracking index (CTI) of a thermoplastic resin, as measured subsequently after a molding is prepared in compliance with IEC60112, 3rd edition, by blending a carbodiimide compound in the thermoplastic resin, wherein
   the improving the comparative tracking index is (i) or (ii) below:
   (i) improving from a CTI that is less than 500 V before the addition of a carbodiimide compound to a CTI that is 500 V or more after the addition of a carbodiimide compound, or
   (ii) the ratio [(CTI-2)/(CTI-1]] of CTI (CTI-1) before the addition of a carbodiimide compound and the CTI (CTI-2) after the addition of a carbodiimide compound is 1.15 or more; and
   the thermoplastic resin has one or more functional groups selected from a carboxy group, a hydroxy group, and an amino group.

2. The method according to claim 1, wherein the carbodiimide compound is blended at a ratio of 0.01 parts by mass or more with respect to 100 parts by mass of the thermoplastic resin.

3. The method according to claim 1, wherein the carbodiimide compound comprises an aromatic carbodiimide compound.

4. The method according to claim 1, wherein the carbodiimide compound has a number average molecular weight of 300 or more.

5. The method according to claim 1, wherein the thermoplastic resin comprises a thermoplastic resin with a processing temperature of 350° C. or less.

6. A tracking resistance improving agent for a thermoplastic resin, for improving the comparative tracking index (CTI) of a thermoplastic resin, as measured subsequently after a molding is prepared in compliance with IEC60112, 3rd edition, the tracking resistance improving agent comprising a carbodiimide compound, wherein
   the improving the comparative tracking index is (i) or (ii) below:
   (i) improving from a CTI that is less than 500 V before the addition of a carbodiimide compound to a CTI that is 500 V or more after the addition of a carbodiimide compound, or
   (ii) the ratio [(CTI-2)/(CTI-1]] of CTI (CTI-1) before the addition of a carbodiimide compound and the CTI (CTI-2) after the addition of a carbodiimide compound is 1.15 or more; and
   the thermoplastic resin has one or more functional groups selected from a carboxy group, a hydroxy group, and an amino group.

7. The tracking resistance improving agent according to claim 6, for use in an amount achieving 0.01 parts by mass or more of the carbodiimide compound with respect to 100 parts by mass of the thermoplastic resin.

8. The tracking resistance improving agent according to claim 6, wherein the carbodiimide compound comprises an aromatic carbodiimide compound.

9. The tracking resistance improving agent according to claim 6, wherein the carbodiimide compound has a number average molecular weight of 300 or more.

10. The tracking resistance improving agent according to claim 6, for a thermoplastic resin having a processing temperature of 350° C. or less.

11. The method according to claim 1, wherein the thermoplastic resin is polybutylene terephthalate.

12. The tracking resistance improving agent according to claim 6, wherein the thermoplastic resin is polybutylene terephthalate.

* * * * *